United States Patent
Albaugh et al.

(10) Patent No.: US 10,113,073 B2
(45) Date of Patent: Oct. 30, 2018

(54) DIELECTRIC THICK FILM INK

(71) Applicant: GM GLOBAL TECHNOLOGY OPERATIONS LLC, Detroit, MI (US)

(72) Inventors: Lisa M. Albaugh, Frankfort, IN (US); David A. Smith, Kokomo, IN (US); Timothy J. Guse, Peru, IN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 619 days.

(21) Appl. No.: 14/680,200

(22) Filed: Apr. 7, 2015

(65) Prior Publication Data

US 2016/0297977 A1    Oct. 13, 2016

(51) Int. Cl.
| | |
|---|---|
| *C09D 11/03* | (2014.01) |
| *H01B 3/12* | (2006.01) |
| *H01B 3/08* | (2006.01) |
| *C09K 5/10* | (2006.01) |
| *C09D 11/037* | (2014.01) |
| *C09D 11/14* | (2006.01) |
| *C09D 11/52* | (2014.01) |

(52) U.S. Cl.
CPC ............ *C09D 11/03* (2013.01); *C09D 11/037* (2013.01); *C09D 11/14* (2013.01); *C09D 11/52* (2013.01); *C09K 5/10* (2013.01); *H01B 3/08* (2013.01); *H01B 3/12* (2013.01)

(58) Field of Classification Search
CPC ....................................................... H01B 3/08
See application file for complete search history.

(56) References Cited

U.S. PATENT DOCUMENTS

| | | | | |
|---|---|---|---|---|
| 4,772,574 A | * | 9/1988 | Hang | ........................ C03C 8/10 |
| | | | | 428/210 |
| 4,788,163 A | | 11/1988 | Hang | |
| 4,808,673 A | * | 2/1989 | Hang | ..................... C03C 3/062 |
| | | | | 252/512 |
| 4,863,517 A | * | 9/1989 | Hang | ........................ C03C 8/08 |
| | | | | 106/1.13 |
| 2004/0227476 A1 | * | 11/2004 | Guerra | .............. H02M 7/53875 |
| | | | | 318/400.28 |
| 2008/0169530 A1 | * | 7/2008 | Koebrugge | ......... C04B 35/4682 |
| | | | | 257/532 |

FOREIGN PATENT DOCUMENTS

| | | | |
|---|---|---|---|
| CN | 101894762 A | | 11/2010 |
| CN | 101950600 A | * | 1/2011 |
| DE | 2553178 A1 | | 6/1977 |
| DE | 3788432 T2 | | 6/1994 |

OTHER PUBLICATIONS

Machine translation of CN 101950600A.*

* cited by examiner

*Primary Examiner* — Ian A Rummel
(74) *Attorney, Agent, or Firm* — Reising Ethington, P.C.

(57) ABSTRACT

A thermally conductive thick film dielectric ink for an electronic device includes a mixture of an organic medium, a glass binder, and a technical ceramic powder having ceramic particles dispersed throughout the thick film dielectric ink mixture.

7 Claims, 2 Drawing Sheets

DIELECTRIC THICK FILM INK

TECHNICAL FIELD

The present invention relates generally to thick film inks, and more particularly, to thick film dielectric inks for electronic power modules.

BACKGROUND

Thick film inks are commonly used in the electronics industry and are of increasing importance as trends progress towards smaller circuits. Thick film circuits are formed by an iterative screen printing process generally involving the deposition of several successive layers of conductor and dielectric inks onto a substrate. Thick film circuits are widely used in electronic devices for the automotive industry and include devices such as electronic power modules for alternators, regulators, and power inverters used for hybrid vehicles. Electronic power modules generate a great deal of heat due to high levels of current and voltage, and thus require materials with high thermal conductivity and diffusivity, while still providing electrical insulation between conductive components.

Direct bonded copper (DBC) substrates are commonly used in power modules due to their high level of thermal conductivity. DBC substrates are composed of a ceramic tile such as alumina or silicon nitride, with a sheet of copper bonded to one or both sides of the ceramic tile. The top copper layer can be pre-formed or etched to form an electrical circuit, while the bottom copper layer remains a solid sheet. The DBC substrate is then soldered to a backplane substrate, typically made of aluminum or other conductive metal, which serves as a heat sink.

While DBC substrates in power modules provide a requisite level of electrical isolation and thermal conductivity, the multiple layers add bulk and complexity. Additionally, the solder joint connecting the DBC substrate to the backplane is a potential failure site, due to the high currents and voltages contributing to joint degradation.

SUMMARY

According to one embodiment, there is provided a thermally conductive thick film dielectric ink for an electronic device, wherein the thick film dielectric ink comprises a mixture of an organic medium, a glass binder, and a technical ceramic powder having ceramic particles dispersed throughout the thick film dielectric ink mixture.

According to another embodiment, there is provided an electronic device including a metal layer forming a circuit on which electronic components are disposed, a substrate forming a heat sink, and a thick film dielectric ink layer interposed between the metal layer and the substrate, wherein the thick film dielectric ink layer is thermally, but not electrically, conductive.

According to another embodiment, there is provided a method of making an electronic device, the method including the steps of depositing a thick film thermally conductive dielectric ink overlying a substrate, wherein the thick film thermally conductive dielectric ink comprises a mixture of an organic medium, a glass binder, and a technical ceramic powder. The method further includes firing the thick film thermally conductive dielectric ink to form a bond to the substrate and depositing a thick film conductive ink trace onto the thick film thermally conductive dielectric ink.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE EMBODIMENTS

Various embodiments contemplated herein relate to a thick film dielectric ink for electronic devices, methods for making electronic devices using the thick film dielectric ink, and electronic devices fabricated by such methods. The exemplary embodiments herein provide a thick film dielectric ink for use in electronic devices, and in particular, for use in electronic power modules such as, for example, alternators, regulators, and inverters. Electronic power modules provide physical containment for various electronic components, usually power semiconductor devices (i.e., dies) that are soldered or sintered onto a metal trace. Some power modules contain a single diode or power electronic switch (e.g., MOSFET, IGBT, BJT, Thyristor, GTO or JFET), while others contain multiple semiconductor die that are connected to form an electrical circuit of a certain structure such as a power inverter used in hybrid vehicles.

The thick film dielectric ink includes an organic medium, a glass binder, and a technical ceramic powder selected from one of: aluminum nitride, silicon carbide, beryllium oxide, boron nitride, and silicon nitride. In an exemplary embodiment, the thick film dielectric ink is deposited, e.g., via screen printing, overlying a backplane substrate that is generally aluminum, an aluminum alloy, or other thermally conductive metal. The thick film dielectric ink is dried, and then fired, for example in a furnace, to form a dielectric overlying the backplane substrate. The thick film dielectric ink composition disclosed herein is printable directly on the backplane substrate, has essentially zero electrical conductivity, and high thermal conductivity.

Figure 1:
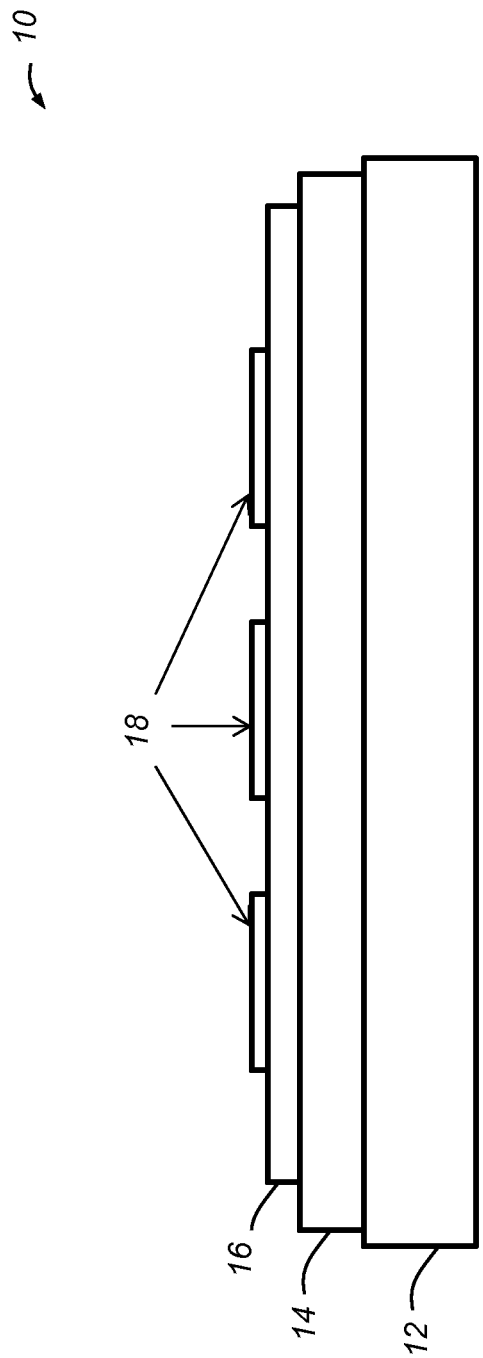
FIG. 1 illustrates an exemplary power module arrangement according to an embodiment of the invention.

FIG. 1 illustrates a perspective view of an exemplary electronic device 10 having a substrate 12, a thick film dielectric ink layer 14, and a metal layer 16 forming a circuit on which electronic components 18 are disposed. The substrate 12 serves as a heat sink and can be, for example, a conductive metallic substrate with a relatively high melting point such as aluminum, copper, or stainless steel, or alternatively, a ceramic substrate containing alumina, silicon nitride, silicon carbide, or aluminum nitride. For example, in one particular embodiment, the melting point of any given aluminum alloy should be over 550° C. so that the thick film dielectric ink layer 14 can be properly fired and adhere to the substrate 12. Other substrates for electronic devices known to those skilled in the art may also be used.

The thick film dielectric ink layer 14 adheres to the substrate 12 and electrically insulates the substrate 12 and from the metal layer 16. The thick film dielectric ink layer 14 is also thermally conductive to transfer heat away from temperature sensitive areas of the device 10. The thick film dielectric ink layer 14 includes an organic medium, a glass binder, and a technical ceramic powder.

In an exemplary embodiment, the organic medium is present in an amount from about 14.0% to about 32.0% by weight of the thick film dielectric ink. The organic medium includes 2,2,4-trimethyl-1,3-pentanediol, Diethylene Glycol Dibutyl Ether, Dodecyl Alcohol, Tridecyl Alcohol, and Ethyl Cellulose. In one embodiment, the 2,2,4-trimethyl-1,3-pentanediol is present in an amount from about 81.0% to about 82.0% by weight of the organic medium, the Diethylene Glycol Dibutyl Ether is present in an amount from about 7.0% to about 11.0% by weight of the organic medium, the Dodecyl Alcohol is present in an amount about 2.0% by weight of the organic medium, the Tridecyl Alcohol is present in an amount from about 1.0% to about 4.0% by weight of the organic medium, and the Ethyl Cellulose is present in an amount from about 3.0% to about 6.5% by weight of the organic medium.

The organic medium is generally prepared by weighing solvents (i.e., % weight) into a beaker and adding the ethyl cellulose. The entire mixture is heated and stirred until the ethyl cellulose is dissolved. The mixture is then cooled to room temperature. Some organic mediums have different solvents and thixotropic agents, but they are all made according to the above procedure. The organic medium of the thick film dielectric ink 14 can include other organic additives known to those skilled in the art.

In an exemplary embodiment, the glass binder is present in an amount from about 48.0% to about 82.0% by weight of the thick film dielectric ink. The glass binder has a median particle size from about 1.0 to about 5.0 μm and a surface area from about 2.0-4.0 m$^2$/g. The softening point of the glass binder is from about 535° to about 540° C. The glass binder includes lead (II) oxide, silicon dioxide, boron trioxide, and aluminum oxide. The lead (II) oxide is present in an amount from about 65.0% to about 67.5% by weight of the glass binder, the silicon dioxide is present in an amount from about 21.5% to about 22.5% by weight of the glass binder, the boron trioxide is present in an amount from about 8.0% to about 9.0% by weight of the glass binder, and the aluminum oxide is present in an amount from about 2.0% to about 3.0% by weight of the glass binder.

In an exemplary embodiment, the technical ceramic powder is present in an amount from about 4.0% to about 22.0% by weight of the thick film dielectric ink. Technical ceramics in general can be classified into three distinct material categories: oxides, non-oxides, and composite materials. Oxides include alumina, beryllia, ceria, and zirconia; non-oxides include carbide, boride, nitride, and silicide; and composite materials include particulate reinforced, fiber reinforced, and combinations of oxides and non-oxides. Preferred for the thick film dielectric ink disclosed herein are the technical ceramics in the oxide and non-oxide categories with a high thermal conductivity; namely, aluminum nitride, silicon carbide, beryllium oxide, boron nitride, and silicon nitride. In one implementation of the thick film dielectric ink, the aluminum nitride powder has a median particle size from about 1.0 to about 5.0 μm, a surface area from about 2.2-2.8 m$^2$/g, and a thermal conductivity of 285 W/mK; the silicon carbide has a median particle size from about 0.1 to about 0.9 μm, but generally no larger than 2.0 μm, a surface area from about 2.5-2.9 m$^2$/g, and a thermal conductivity of 200 W/mK; the beryllium oxide has a median particle size from about 1.0-5.0 um, a surface area from about 2.5-5.0 m$^2$/g, and a thermal conductivity of 250 W/mK; the boron nitride (cubic) has a median particle size from about 0.1 to about 0.5 μm, but generally no larger than 1.0 μm, a surface area from about 2.5-5.0 m$^2$/g, and a thermal conductivity of 740 W/mK; and the silicon nitride has a median particle size from about 0.1-1.5 um, a surface area of 2.5-5.0 m2/g, and a thermal conductivity of 54 W/mK.

The formula for the thick film dielectric ink is optimized to provide the highest possible thermal conductivity and breakdown voltage per unit thickness. As the breakdown voltage requirements increase, the thickness of the thick film dielectric ink layer 14 increases by performing additional print steps, up to a point at which the thermal transfer properties start to decrease. In one embodiment, the optimal thickness of the thick film dielectric ink layer 14 is 45-75 um for an electronic device 10 to achieve a breakdown voltage of greater than 1000 volts AC. Additional performance may be achieved by adding additional prints to increase the thickness of the dielectric ink layer 14. The formula may vary by adjusting the weight % ratio, and in particular, the ratio of the technical ceramic powders to the organic medium. In one specific non-limiting example, the thick film dielectric ink includes the organic medium present in an amount of about 32.0% by weight of the thick film dielectric ink, the glass binder present in an amount of about 48.0% by weight of the thick film dielectric ink, and the technical ceramic powder present in an amount of about 20.0% by weight of the thick film dielectric ink.

The thick film dielectric ink 14 is prepared according to thick film technology standards, which is well-known to one of ordinary skill in the art. To create a homogenous ink, the organic medium, the glass binder and the technical ceramic powder are mixed to produce a paste, which is then put through a three roll mill. Once prepared, the ceramic particles from the technical ceramic powder remain intact, but are uniformly dispersed throughout the ink. The thermal conductivity of the prepared ink depends on the technical ceramic powder that is used. However, it can be assumed that it will be lower than the raw ceramic powder. For example, the thermal conductivity of aluminum nitride powder can be as high as 285 W/m·K for single crystals. Whereas an exemplary embodiment of the thick film dielectric ink prepared with aluminum nitride powder, based on experimental results, has a thermal conductivity of approximately 146-166 W/m·K, but more specifically between approximately 156-160 W/m·K. In general, the thermal conductivity of an ink manufactured with a specific technical ceramic would be approximately 50-60% of its bulk thermal conductivity. For example, if a given technical ceramic of material X in powder form has a thermal conductivity of approximately 100 W/m·K, then the thermal conductivity of the technical ceramic of the ink made with that same technical ceramic would be approximately 55 W/m·K. In addition, one of ordinary skill in the art understands that, in general, anything above 50 W/m·K may be considered to have high thermal conductivity properties.

Figure 2:
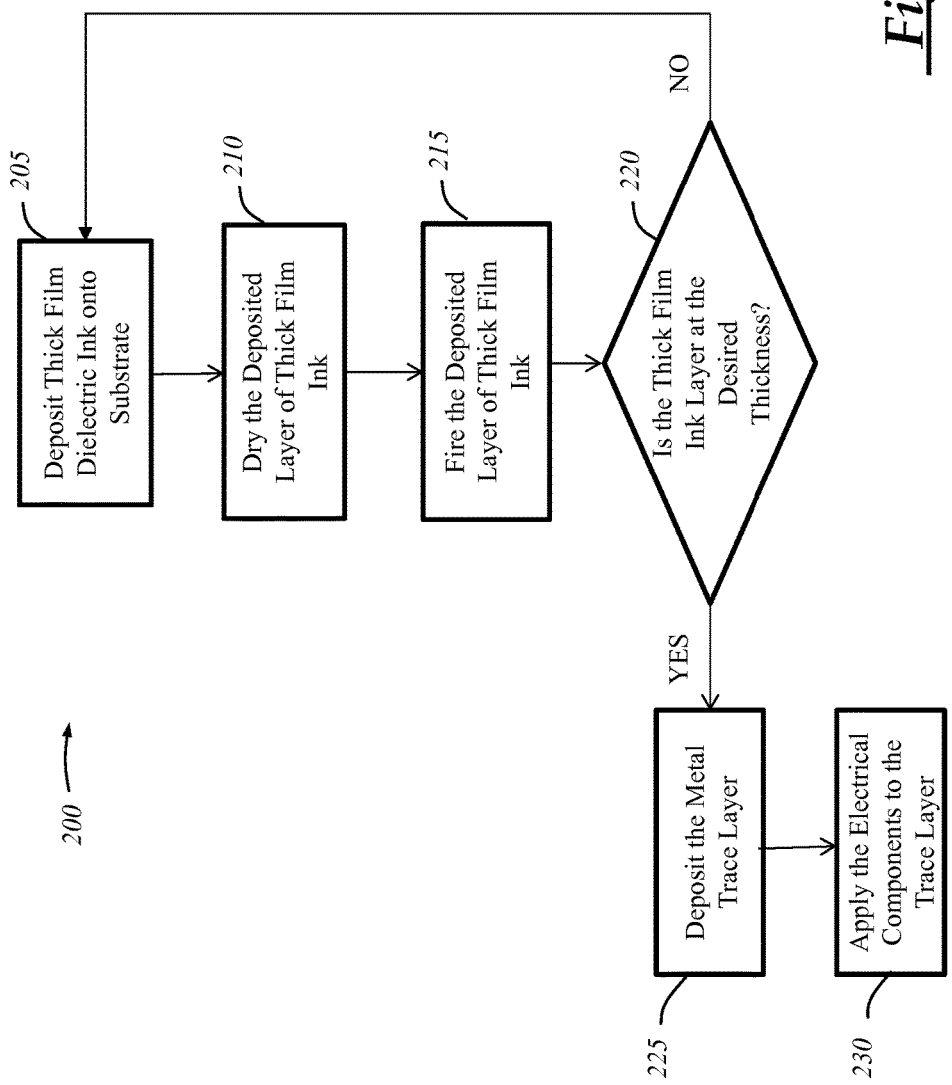
FIG. 2 is a flow chart illustrating an exemplary method of making the power module of FIG. 1 according to an embodiment of the invention.

FIG. 2 is a flow chart depicting an exemplary method 200 for fabricating the electronic device 10 shown in FIG. 1. At step 205, the thick film dielectric ink 14 is deposited onto substrate 12. In one embodiment, the thick film ink is deposited onto substrate 12 via screen printing, which is a printing technique that uses a woven mesh to support an ink-blocking stencil to receive a desired image or pattern. The stencil forms open areas of mesh that transfer ink or other printable materials that can be pressed through the mesh as a sharp-edged image onto a substrate. A fill blade or squeegee is moved across the screen stencil, forcing or pumping ink through the mesh openings to wet the substrate during the squeegee stroke. The screen material is characterized by the thread diameter and mesh count, which is the number of open spaces per lineal inch. For the printing of the thick film dielectric ink 14 onto substrate 12, a medium mesh count from about 200 to about 325 wires/inch with a high open area is preferred.

At step 210, the layer of thick film ink deposited onto the substrate 12 at step 205 is dried at about 150° to about 250° C. for 5-10 minutes to create a dry film and to remove the light volatile solvents in the deposited ink. At step 215, the thick film ink layer is fired in a furnace at about 545° to about 575° C., depending on the substrate material. For example, an aluminum alloy substrate may be fired at 550° C. with a 6-8 minute dwell at peak temperature. Firing the thick film ink removes the heavier organics, melts the glass binder, and allows the inorganic components to form a dense uniform film that is tightly bonded to the substrate surface.

At step 220, a determination is made as to whether a desired thickness of the thick film dielectric has been reached. If the current thickness of the thick film dielectric layer 14 has not reached the desired thickness, then the printing, drying, and firing processes at step 205, 210, and 215 are repeated until the desired thickness of the thick film dielectric layer 14 is achieved.

Once the desired thickness of the thick film dielectric layer 14 is achieved, at step 225 the metal trace layer 16 that forms a circuit on the electronic device 10 is deposited according to known methods. However, it should be noted that the metal trace layer 16 must be capable of being fired at a similarly low temperature and adhere well to the thick film dielectric ink after firing. At step 230, the electrical components 18 or die are applied by soldering or sintering.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A thermally conductive thick film dielectric ink for an electronic device, the thermally conductive thick film dielectric ink comprising a mixture of:
   an organic medium present in an amount from about 14.0 to about 32.0% by weight of the thick film dielectric ink, wherein the organic medium comprises 2,2,4-trimethyl-1,3-pentanediol present in an amount from about 81.0% to about 82.0% by weight of the organic medium, Diethylene Glycol Dibutyl Ether present in an amount from about 7.0% to about 11.0% by weight of the organic medium, Dodecyl Alcohol present in an amount about 2.0% by weight of the organic medium, Tridecyl Alcohol present in an amount from about 1.0% to about 4.0% by weight of the organic medium, and Ethyl Cellulose present in an amount from about 3.0 to about 6.5% by weight of the organic medium;
   a glass binder; and
   a technical ceramic powder having ceramic particles dispersed throughout the thermally conductive thick film dielectric ink mixture.

2. The thermally conductive thick film dielectric ink of claim 1, wherein the technical ceramic powder is present in an amount from about 4.0% to about 22.0% by weight of the thick film dielectric ink.

3. The thermally conductive thick film dielectric ink of claim 2, wherein the technical ceramic powder is aluminum nitride, silicon carbide, beryllium oxide, boron nitride, or silicon nitride.

4. The thermally conductive thick film dielectric ink of claim 1, wherein the glass binder is present in an amount from about 48.0% to about 82.0% by weight of the thick film dielectric ink.

5. The thermally conductive thick film dielectric ink of claim 4, wherein the glass binder comprises lead(II) oxide, silicon dioxide, boron trioxide, and aluminum oxide.

6. The thermally conductive thick film dielectric ink of claim 5, wherein the lead(II) oxide is present in an amount from about 65.0% to about 67.5% by weight of the glass binder, the silicon dioxide is present in an amount from about 21.5% to about 22.5% by weight of the glass binder, the boron trioxide is present in an amount from about 8.0% to about 9.0% by weight of the glass binder, and the aluminum oxide is present in an amount from about 2.0% to about 3.0% by weight of the glass binder.

7. A power inverter for hybrid vehicles comprising:
   a metal layer forming a circuit on which electronic components are disposed;
   a substrate forming a heat sink; and
   a thick film thermally conductive dielectric ink layer according to claim 1, wherein the thick film thermally conductive dielectric ink layer is interposed between the metal layer and the substrate.

* * * * *